United States Patent
Wei et al.

(10) Patent No.: US 11,445,826 B2
(45) Date of Patent: Sep. 20, 2022

(54) WHITEBOARD

(71) Applicant: Xiamen Sheng Cheng Xin Technology Co., Ltd., Xiamen (CN)

(72) Inventors: Dongyang Wei, Xiamen (CN); Jinping Xu, Xiamen (CN)

(*) Notice: Subject to any disclaimer, the term of this patent is extended or adjusted under 35 U.S.C. 154(b) by 0 days.

(21) Appl. No.: 17/356,577

(22) Filed: Jun. 24, 2021

(65) Prior Publication Data

US 2022/0183464 A1   Jun. 16, 2022

(30) Foreign Application Priority Data

Dec. 11, 2020  (CN) .......................... 202022986790.9
Apr. 21, 2021  (CN) .......................... 202120824035.2

(51) Int. Cl.
*A47B 97/04* (2006.01)
*B43L 1/00* (2006.01)

(52) U.S. Cl.
CPC ............... *A47B 97/04* (2013.01); *B43L 1/00* (2013.01)

(58) Field of Classification Search
CPC ......... A47B 97/04; A47B 85/06; A47B 85/00; A47B 13/003; A47B 5/04; B43L 1/00
USPC ..... 248/441.1, 447, 449, 454, 460, 463, 464
See application file for complete search history.

(56) References Cited

U.S. PATENT DOCUMENTS

| | | | |
|---|---|---|---|
| 7,195,491 B1* | 3/2007 | Chen | B43L 1/00 434/408 |
| 8,539,889 B1* | 9/2013 | Khalaf Allah | A47B 85/06 108/115 |
| 10,617,207 B2* | 4/2020 | Hsiao | A47B 85/06 |
| 2017/0232783 A1* | 8/2017 | Oh | B60B 33/063 434/408 |
| 2020/0152098 A1* | 5/2020 | Jokelainen | F16M 11/10 |

* cited by examiner

*Primary Examiner* — Muhammad Ijaz
(74) *Attorney, Agent, or Firm* — W&K IP

(57) ABSTRACT

A whiteboard includes a whiteboard support and a board body, the whiteboard support includes two support rods arranged in parallel with each other, and each of them is formed by rigidly connecting the first tube body and the second tube body, can be detached one by one, and then stored. Compared with the one-piece support rod of the conventional whiteboard, the whiteboard according to the present embodiment greatly reduces the occupied area and reduces the difficulty in transportation, and the transportation cost for the enterprise. Meanwhile, by providing at least two insertion slots at different heights on the side of the support rod facing the board body, the board body of the whiteboard can be adjusted in height so as to adapt to use of people of different heights.

9 Claims, 12 Drawing Sheets

WHITEBOARD

CROSS REFERENCE TO RELATED APPLICATIONS

This application is based upon and claims priority to Chinese Patent Applications, No. 202022986790.9, filed on Dec. 11, 2020, and No. 202120824035.2, filed on Apr. 21, 2021, and the entire contents of which are incorporated herein by reference.

FIELD

The present application relates to the technical field of stationery, in particular to a whiteboard that is convenient for logistics and transportation.

BACKGROUND

The whiteboard is a writing tool that can be erased and written repeatedly. It is usually used for meeting discussions or note taking in the office. The conventional whiteboard includes a board body, a whiteboard support and casters. The whiteboard support includes two support rods, a base and a crossbar spanning between two upright posts. The board body is arranged between the two support rods, and the casters are installed to the base.

The support rod of the conventional whiteboard support is generally a one-piece member made of an iron tube and having a longer length. A tall user may generally purchase a long support rod so that the board body can be placed at generally the same height as the user to facilitate the writing. However, when to perform logistics and transportation for the whiteboard, its cost of logistics and transportation is positively related to the container space occupied by its packaging, that is, the longer the support rod is, the larger the overall volume of the packaging is, which results in a further increase of logistics and transportation costs.

SUMMARY

The present application is to provide a whiteboard that is convenient for disassembly, assembly, logistics and transportation.

In order to achieve the purpose of the present application, a whiteboard includes a whiteboard support and a board body, wherein the whiteboard support includes two support rods arranged in parallel with each other, wherein each of the support rods comprises a first tube body and a second tube body from top to bottom, the number of the first tube body is at least one and the first tube body is a straight tube body; the number of the second tube body is one, and the second tube body is a T-shaped tube composed of two straight tube bodies arranged perpendicular to each other, the first tube body and the second tube body each have a hollow inner cavity, and contact surfaces capable of abutting against and fitting with each other are formed at least between the end faces of the first tube body and an upright rod section of the second tube body, the first tube body is fixedly provided with an insertion block in the inner cavity of one end facing the upright rod section of the second tube body, the insertion block extends outward from the inner cavity of the first tube body, and the insertion block is provided with a first threaded hole at an end away from the first tube body, the insertion block of the first tube body is inserted into the inner cavity of the upright rod section of the second tube body from top to down, which allows the end faces facing each other of the first tube body and the upright rod section of the second tube body to abut against and joint to each other; an outer end face of the upright rod section of the second tube body is provided with a first through hole at a position corresponding to the first threaded hole, a first bolt passes through the first through hole and is screwed into the first threaded hole of the insertion block, which allows the upright rod section of the second tube body and the first tube body to preliminarily fix to each other, a positioning plane is formed at least on inner end faces of the first tube body and the upright rod section of the second tube body adjacent to the joint between the first tube body and the upright rod section of the second tube body, and the inner end face and an outer end face of the first tube body are provided with second through holes extending through each other in a direction perpendicular to the positioning plane, the inner end face and the outer end face of the upright rod section of the second tube body are provided with third through holes extending through each other in the direction perpendicular to the positioning plane, and the insertion block is provided with a fourth through hole at a position corresponding to the third through holes.

Specifically, a first crossbar, wherein a first connecting piece is fixedly provided inside each of two ends of the first crossbar, and the first connecting piece is provided with a second threaded hole and a third threaded hole, the second threaded hole is positionally corresponding to the second through holes, and the third threaded hole is positionally corresponding to the third through holes.

Two second bolts each pass through the second through holes in turn from the outside to the inside and are screwed and locked in the second threaded hole of the first connecting piece.

Two third bolts each pass through the third through holes and the fourth through hole in turn from the outside to the inside and are screwed and locked in the third threaded hole of the first connecting piece.

Each of the two ends of the first crossbar abuts against and is locked to the positioning plane formed by the respective first tube body and the respective upright rod section of the second tube body jointed to each other, which allows the first tube body and the upright rod section of the second tube body to rigidly connect to each other and form the support rod, and ultimately the two support rods and the first crossbar to form a stable and upright whiteboard support.

The board body is arranged between the two support rods.

With the above structure, since the support rod of the whiteboard adopts the design of a split-type structure, the length of the support rod can be significantly reduced, which facilitates the reduction of the packaging volume, thereby reducing logistics and transportation costs. Meanwhile, since the insertion block is additionally provided inside the first tube body, the insertion block of the first tube body is inserted into the inner cavity of the upright rod section of the second tube body, and the first bolt is secured into the first threaded hole of the insertion block, which achieves the preliminary fixation between the first tube body and the upright rod section of the second tube body, and facilitates the subsequent threaded connection and locking of the first tube body and the first crossbar to each other by the second bolt, and also the threaded connection and locking of the upright rod section of the second tube body and the first crossbar to each other by the third bolt, such that a rigid connection is formed between the first tube body and the second tube body and a stable support rod is obtained.

Further, the insertion block is a U-shaped piece, and this design can ensure that minimum possible material is used on the premise of meeting the structural strength of the insertion block, which reduces the production cost.

Further, the upright rod section of the second tube body is additionally provided with a flange at the end adjacent to the first tube body, and the flange is inserted into the inner cavity of the first tube body with a transition fit being formed between the flange and an inner wall of the first tube body, which further improves the convenience of jointing the first body and the upright rod section of the second tube body.

Further, the present application also discloses a whiteboard which further includes two position-limiting cylinders, a second crossbar and a position-limiting device. A frame is provided around the periphery of the board body, and the two position-limiting cylinders are respectively fixed on two sides of the frame of the board body, and are rotatably arranged between the two first tube bodies. The second crossbar is located below the board body, and is detachably fixedly connected between the two first tube bodies. The position-limiting device is arranged in the middle of the second crossbar, and the position-limiting device has at least one engaging groove to engage with the board body, and the engaging groove has a downwardly elastic margin, and when the engaging groove is not in a state of elastic deformation, the position-limiting device is configured to limit the board body to be rotatably arranged between the two first tube bodies, and when the engaging groove is elastically deformed downward under a force, the board body does not interfere with the engaging groove, which allows the board body to be rotatably arranged between the two first tube bodies. By additionally providing the position-limiting device, the board body is arranged between the two first tube bodies and can rotate 180°.

Further, the present application discloses that each of the first tube bodies of the whiteboard is provided with at least a first insertion slot and a second insertion slot at different heights on the side facing the board body, and the position-limiting cylinder is optionally inserted into the first insertion slot or the second insertion slot to realize the pivotal connection between the board body and the whiteboard support. Each of the first tube bodies is provided with two pairs of fifth through hole group respectively below the first insertion slot and the second insertion slot at a distance of H from the respective insertion slots, each pair of the fifth through hole group includes at least two fifth through holes arranged side by side in the vertical direction, and a second connecting piece is fixedly arranged inside each of the two ends of the second crossbar, the second connecting piece is provided with two fourth threaded holes at positions respectively corresponding to the two fifth through holes, and two fourth bolts pass through the fifth through holes from the outside to the inside and are locked to the fourth threaded holes, which allows the second crossbar to be fixedly connected between the two first tube bodies, and by inserting the position-limiting cylinders of the board body into the first insertion slots or the second insertion slots of different heights, and meanwhile by locking the second crossbar to the fifth through hole groups at the corresponding distance of H from the respective insertion slots, the board body is arranged between the two first tube bodies in a height-adjustable manner.

DETAILED DESCRIPTION OF EMBODIMENTS

The terms "first" and "second" are used only for descriptive purposes, and cannot be construed as indicating or implying relative importance or implicitly indicating the number of technical features indicated. Thus, the feature defined with "first" or "second" may explicitly or implicitly include one or more of this feature.

The present embodiment will be described in detail below with reference to the drawings and embodiments.

Figure 1:
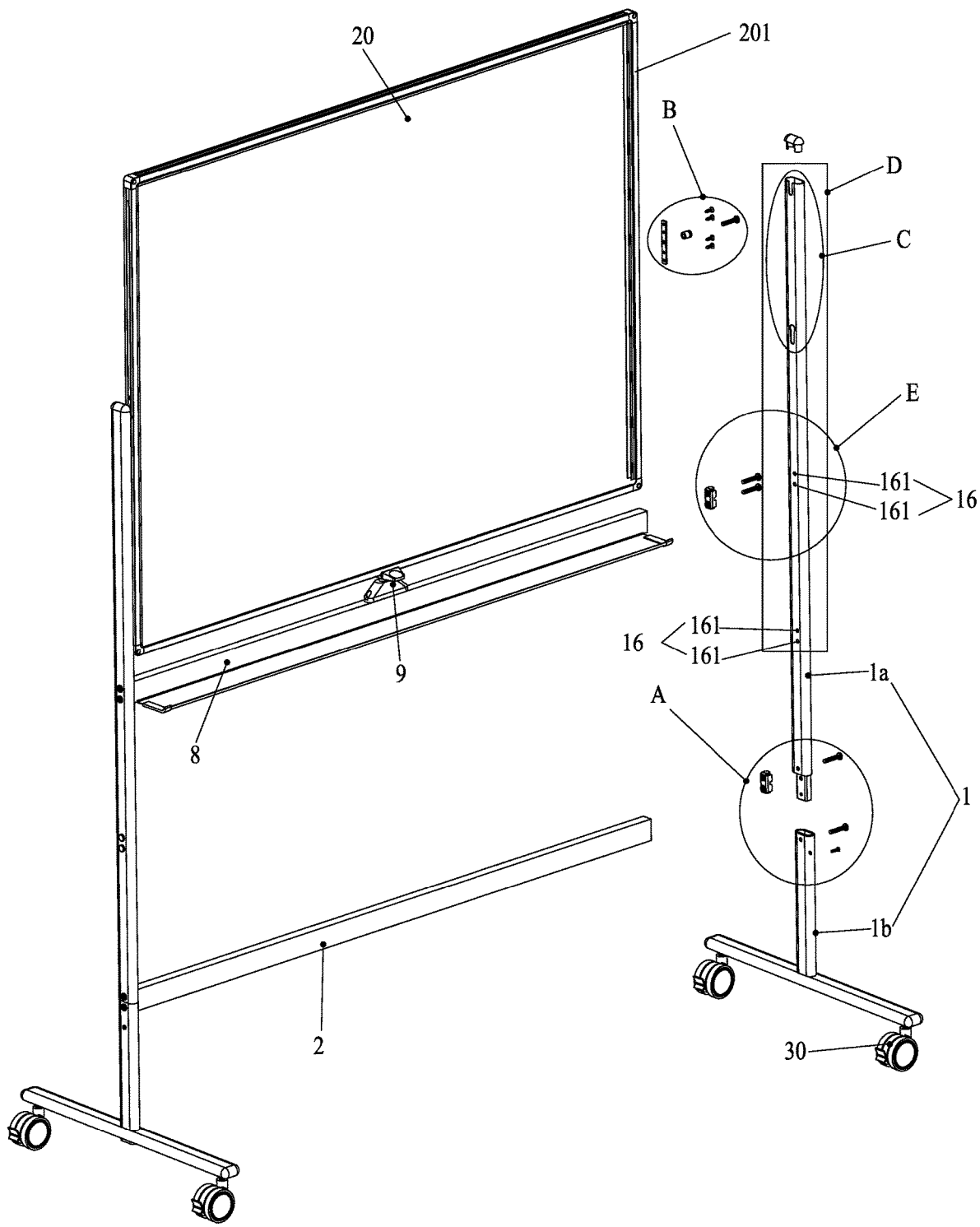
FIG. 1 is a partially exploded view of a whiteboard according to the present embodiment.
Figure 4:
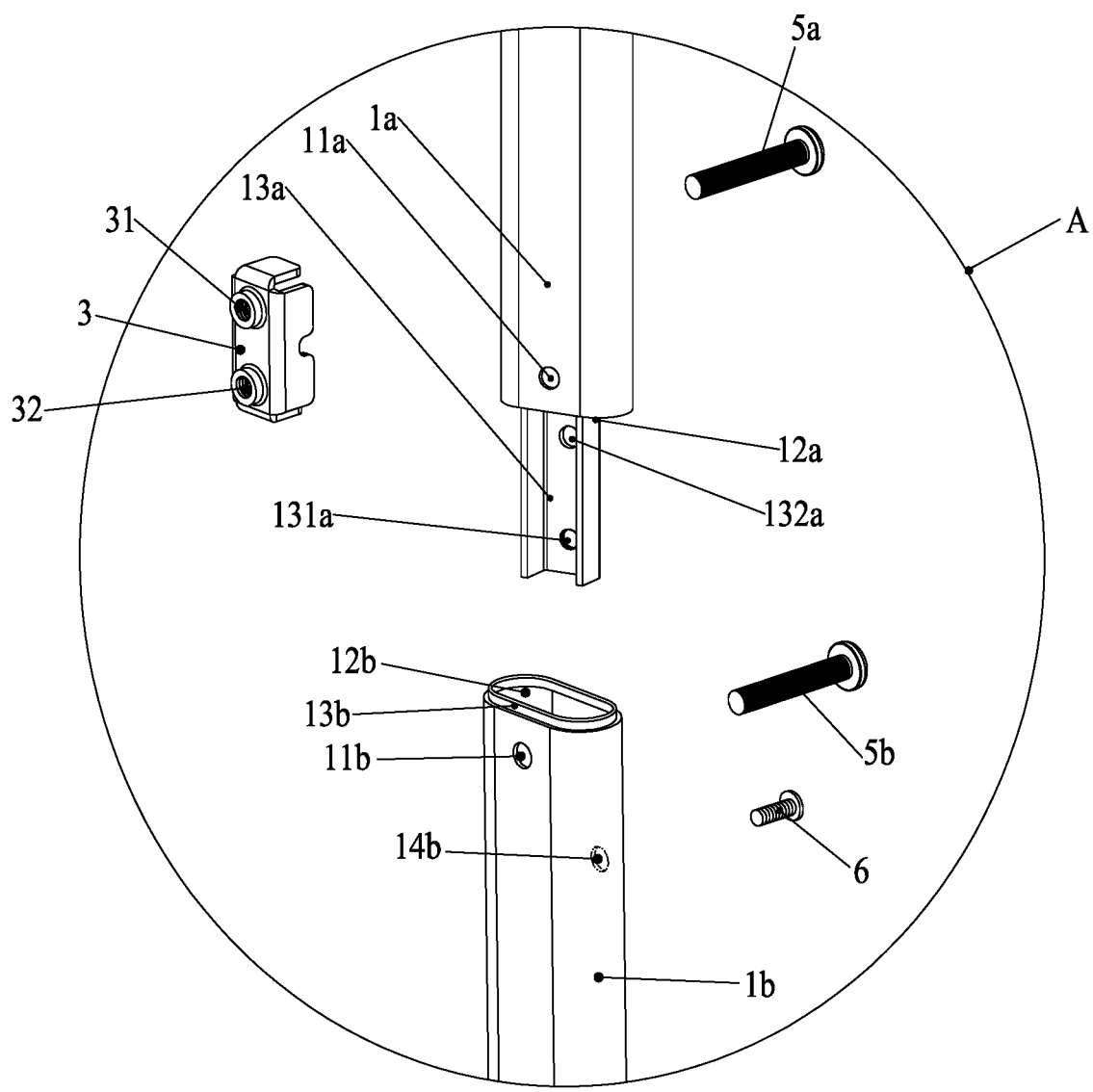
FIG. 4 is an enlarged view of part A in FIG. 1.
Figure 5:
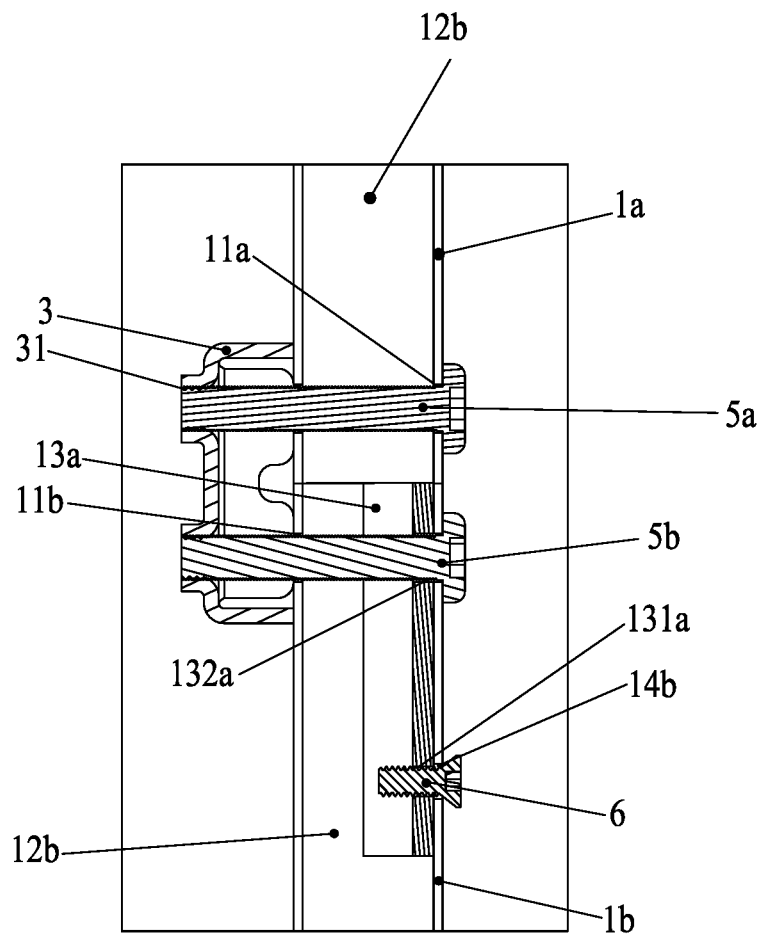
FIG. 5 is a longitudinal sectional view of FIG. 4 in an assembled state.
Figure 6:
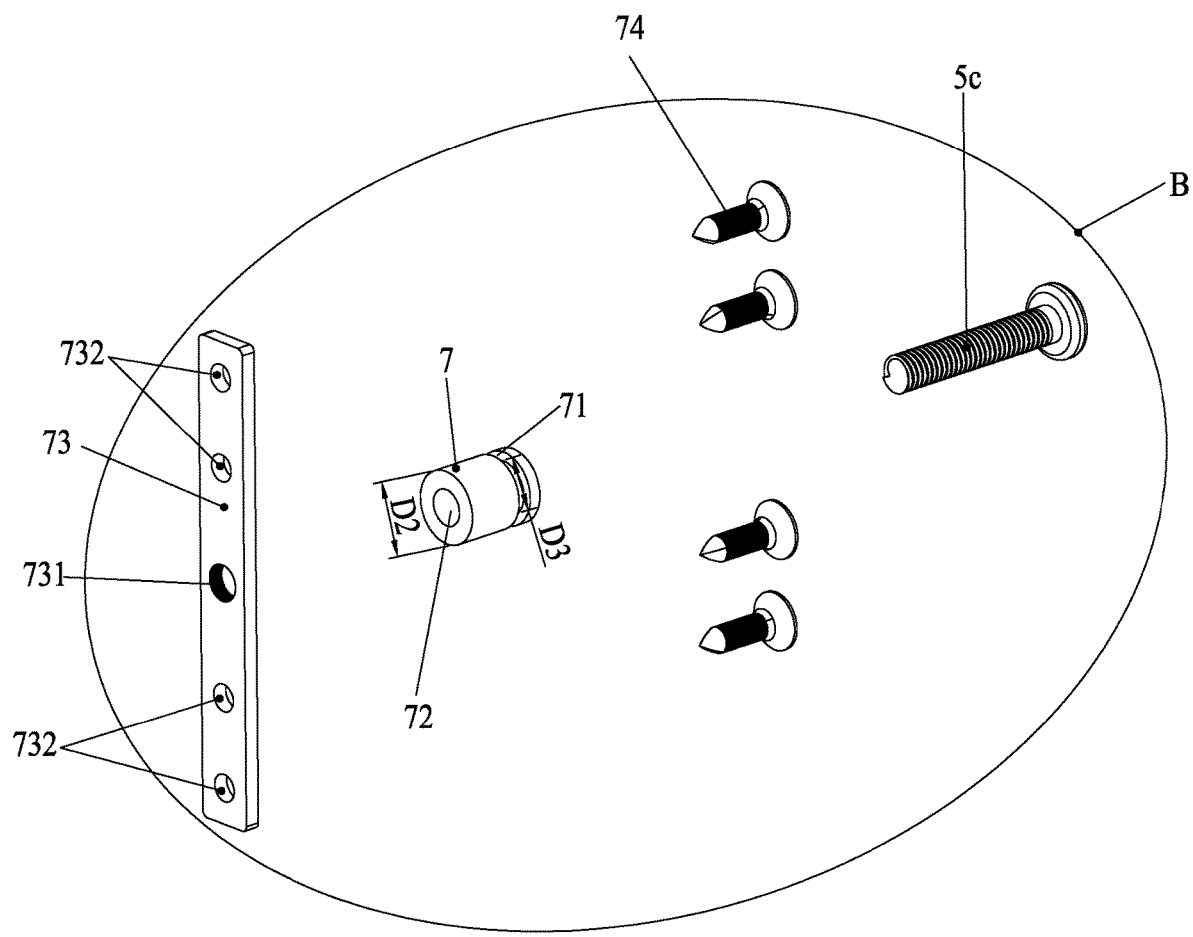
FIG. 6 is an enlarged view of part B in FIG. 1.

As shown in FIGS. 1 and 4, the present embodiment discloses a whiteboard, which includes a whiteboard support 10, a board body 20, two first bolts 6, two second bolts 5a and two third bolts 5b. The whiteboard support 10 includes two support rods 1 arranged in parallel with each other and a first crossbar 2. At the bottom of each of the support rods 1, two universal wheels 30 are installed, and the universal wheels 30 are each provided with a locking device.

Figure 2:
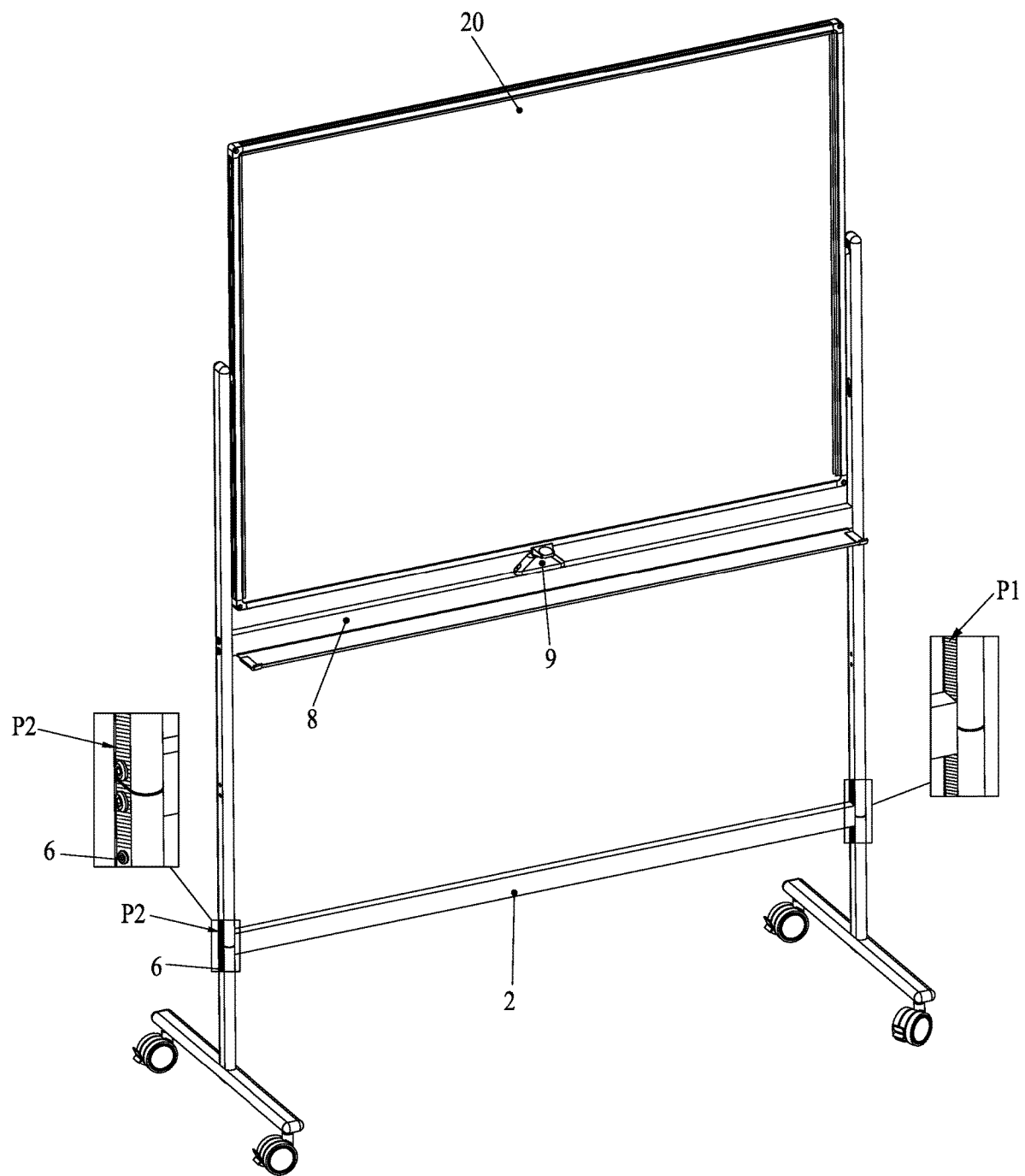
FIG. 2 is a diagram showing the whiteboard according to the present embodiment in an assembled state.

Each of the support rods 1 includes a first tube body 1a and a second tube body 1b from top to bottom, the number of the first tube body 1a is at least one and the first tube body 1a is a straight tube body; and the number of the second tube body 1b is one, and the second tube body 1b is a T-shaped tube composed of two straight tube bodies arranged perpendicular to each other. The first tube body 1a and the second tube body 1b each have a hollow inner cavity, and contact surfaces capable of abutting against and fitting with each other are formed at least between the end faces of the first tube body 1a and an upright rod section of the second tube body 1b. The first tube body 1a is fixedly provided with an insertion block 13a in the inner cavity of one end facing the upright rod section of the second tube body 1b. The insertion block 13a extends outward from the inner cavity of the first tube body 1a, and the insertion block 13a is provided with a first threaded hole 131a at an end away from the first tube body 1a. The insertion block 13a is preferably a U-shaped piece having a U-shaped cross section. Such a design can ensure that minimum possible material is used for the insertion block 13a on the premise of meeting the structural strength of the insertion block 13a, which reduces the production cost. The insertion block 13a is inserted into the inner cavity 12b of the upright rod section of the second tube body 1b. The second tube body 1b is provided with a first through hole 14b at a position corresponding to the first threaded hole 131a. A first bolt 6 passes through the first through hole 14b and is screwed into the first threaded hole 131a of the insertion block 13a, which allows the upright rod section of the second tube body 1b and the first tube body 1a to preliminarily joint and fix to each other. Preferably, as shown in FIG. 4, the upright rod section of the second tube body 1b is additionally provided with a flange 13b at the end adjacent to the first tube body 1a, and the flange 13b is inserted into the inner cavity 12a of the first tube body and forms a transition fit with an inner wall of the first tube body 1a, which facilitates the subsequent jointing of the insertion block 13a of the first tube body 1a and the second tube body 1b, and allows the connection to be more stable between the first tube body 1a and the upright rod section of the second tube body 1b. As shown in FIG. 2, a positioning plane P1 is formed at least on inner end faces of the first tube body 1a and the upright rod section of the second tube body 1b adjacent to the joint, and meanwhile an abutting plane P2 is formed at least at a position relative to the positioning plane P1 on outer end faces of the first tube body 1a and the upright rod section of the second tube body 1b, and the abutting plane P2 and the positioning plane P1 are in parallel with each other. The inner end face and an outer end face of the first tube body 1a are provided with second through holes 11a extending through each other in a direction perpendicular to the positioning plane P1, the inner end face and an outer end face of the upright rod section of the second tube body 1b are provided with third through holes 11b extending through each other in the direction perpendicular to the positioning plane P1, and the insertion block 13a is provided with a fourth through hole 132a at a position corresponding to the third through holes 11b.

As shown in FIGS. 1 and 4, a first connecting piece 3 is fixedly provided inside each of two ends of the first crossbar 2, and the first connecting piece 3 is provided with a second threaded hole 31 and a third threaded hole 32. The second threaded hole 31 is positionally corresponding to the second through holes 11a, and the third threaded hole 32 is positionally corresponding to the third through holes 11b. Each of the two second bolts 5a passes through the second through hole 11a in the outer end face and the second through hole 11a in the inner end face in turn from the abutting plane P2 to the positioning plane P1 and is screwed and locked in the second threaded hole 31 of the first connecting piece 3; and each of the two third bolts 5b passes through the third through hole 11b in the outer end face, the fourth through hole 132a of the insertion block 13a and the third through hole 11b in the inner end face in turn from the abutting plane P2 to the positioning plane P1 and is screwed and locked in the third threaded hole 32 of the first connecting piece 3. Since the abutting plane P2 is configured to be flat, it is convenient for inner end faces of end caps of the second bolt 5a and the third bolt 5b to abut against the abutting plane P2 and be supported, and moreover, the positioning plane P1 is configured to be flat, which is also convenient for the first connecting piece 3 of the first crossbar 2 to abut against the positioning plane P1 and be supported, such that each of the two ends of the first crossbar 2 abuts against and is locked to the positioning plane P1 formed by the respective first tube body 1a and the respective upright rod section of second tube body 1b jointed to each other, which allows the first tube body 1a and the upright rod section of the second tube body 1b to rigidly connect to each other and form the support rod 1. As shown in FIG. 2, ultimately the two support rods 1 and the first crossbar 2 form a stable and upright whiteboard support 10, and the board body 20 is arranged between the two support rods 1.

Apparently, multiple first tube bodies 1a can be provided, and the rigid connection between the first tube bodies 1a, reference can be made to the way of the rigid connection between the first tube body 1a and the upright rod section of the second tube body 1b, which is not repeatedly here. Meanwhile, it should be emphasized that a fixed end of the insertion block 13a is not necessarily arranged in the inner cavity of the first tube body 1a, and the fixed end of the insertion block 13a can also be arranged in the inner cavity of the upright rod section of the second tube body 1b, and the extension section of the insertion block 13a extends upward and can be inserted into the inner cavity of the first tube body 1a. The adjustment of the fixed end position of the insertion block 13a does not change the inventive concept of the rigid connection structure between the first tube body 1a and the upright rod section of the second tube body 1b.

Figure 10:
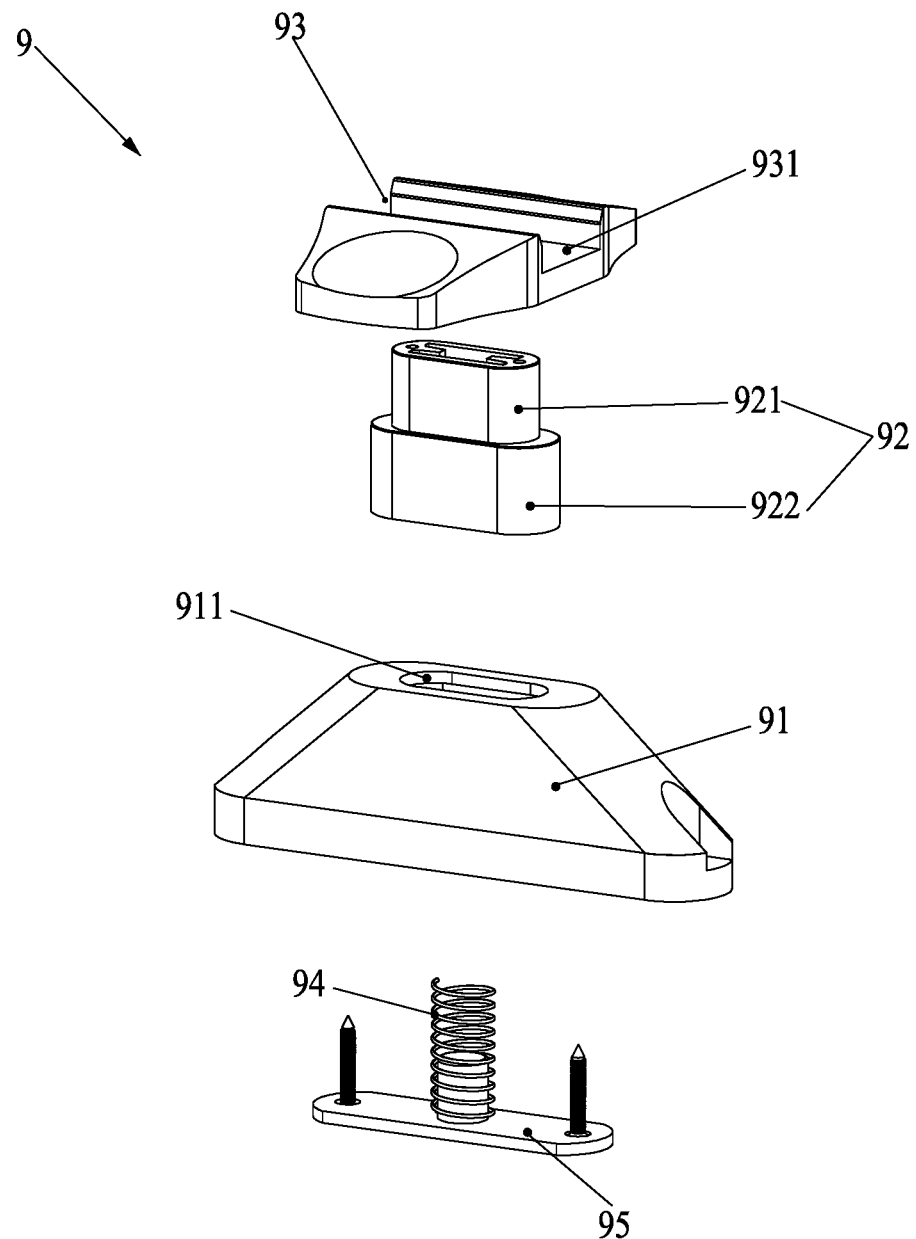
FIG. 10 is an exploded view of a position-limiting device according to the present embodiment.
Figure 11:
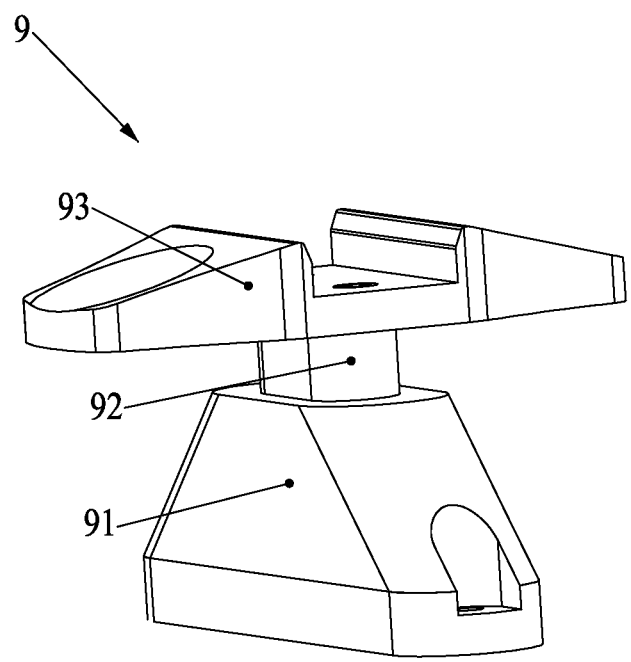
FIG. 11 is a diagram showing the position-limiting device according to the present embodiment in an assembled state.
Figure 12:
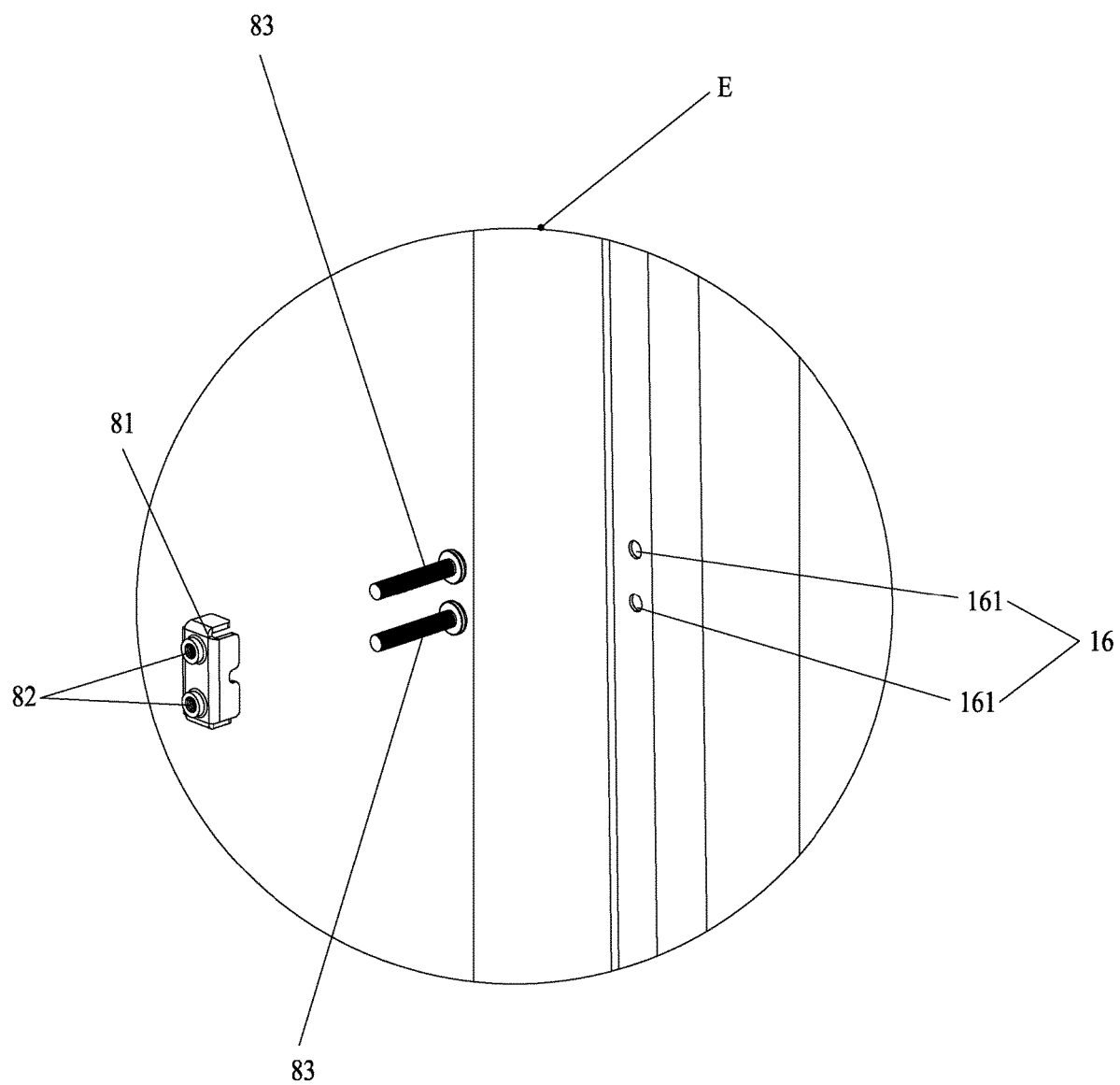
FIG. 12 is an enlarged view of part E in FIG. 1.

On this basis, the present embodiment discloses a whiteboard whose board body can be adjusted by 180 degrees, and the whiteboard further includes two position-limiting cylinders 7, a second crossbar 8 and a position-limiting device 9. A frame 201 is provided around the periphery of the board body 20, and the two position-limiting cylinders 7 are respectively fixed on two sides of the frame 201 through retaining plates 73. Specifically, each of the retaining plates 73 is a flat plate provided with a fifth threaded hole 731 in the middle and several sixth through holes 732 on two sides. Each screw 74 passes through the corresponding sixth through hole 732, which allows the retaining plate 73 to fix onto the frame 201. The position-limiting cylinder 7 has an axial through hole 72, and a fifth bolt 5c passes through the axial through hole 72 and is screwed to the fifth threaded hole 731, which allows the position-limiting cylinders 7 to fixedly connect to the two sides of the frame 201, and to be rotatably arranged between the two first tube bodies 1a. As shown in FIG. 12, the second crossbar 8 is located below the board body 20, and a second connecting piece 81 is fixedly arranged inside each of the two ends of the second crossbar 8. The second connecting piece 81 is provided with two fourth threaded holes 82 at positions respectively corresponding to two fifth through holes 161, and two fourth bolts 83 pass through the fifth through holes 161 from the outside to the inside and are locked to the fourth threaded holes 82, which allows the second crossbar 8 to be detachably and fixedly connected between the two first tube bodies 1a. The position-limiting device 9 is arranged in the middle of the second crossbar 8, as shown in FIGS. 10 and 11, the position-limiting device 9 includes a base 91, a connecting portion 92, an engaging seat 93, a spring 94 and a spring seat 95. The connecting portion 92 has a small-diameter end 921 and a large-diameter end 922 from top to bottom. The base 91 has a hollow inner cavity, and has an open end 911 at its top. The spring seat 95 and the connecting portion 92 are arranged to pass through the inner cavity of the base 91 from bottom to top, which allows the spring seat 95 to fixedly connect to the bottom end of the base 91 and the small-diameter end 921 of the connecting portion 92 to protrude outwards from the open end 911 of the base 91. The engaging seat 93 fixedly connects to an upper end of the connecting portion 92, and the engaging seat 93 has an engaging groove 931 to engage with the board body 20. The spring 94 is disposed into the base 91, and has two ends respectively abutting against the large-diameter end 922 of the connecting portion 92 and the spring seat 95. By pressing the engaging seat 93 downwardly, the connecting portion 92 is displaced downward in the inner cavity of the base 91, and the angle of the board body 20 is adjusted. When the engaging seat 93 is released, the connecting portion 92 drives the engaging seat 93 to move upwardly by an elastic restoring force applied by the spring 94 to the connecting portion 92, which allows the engaging groove 931 of the engaging base 93 to engage with the board body 20, and the angle of the board body 20 to be fixed, leading to the convenience in use.

Figure 7:
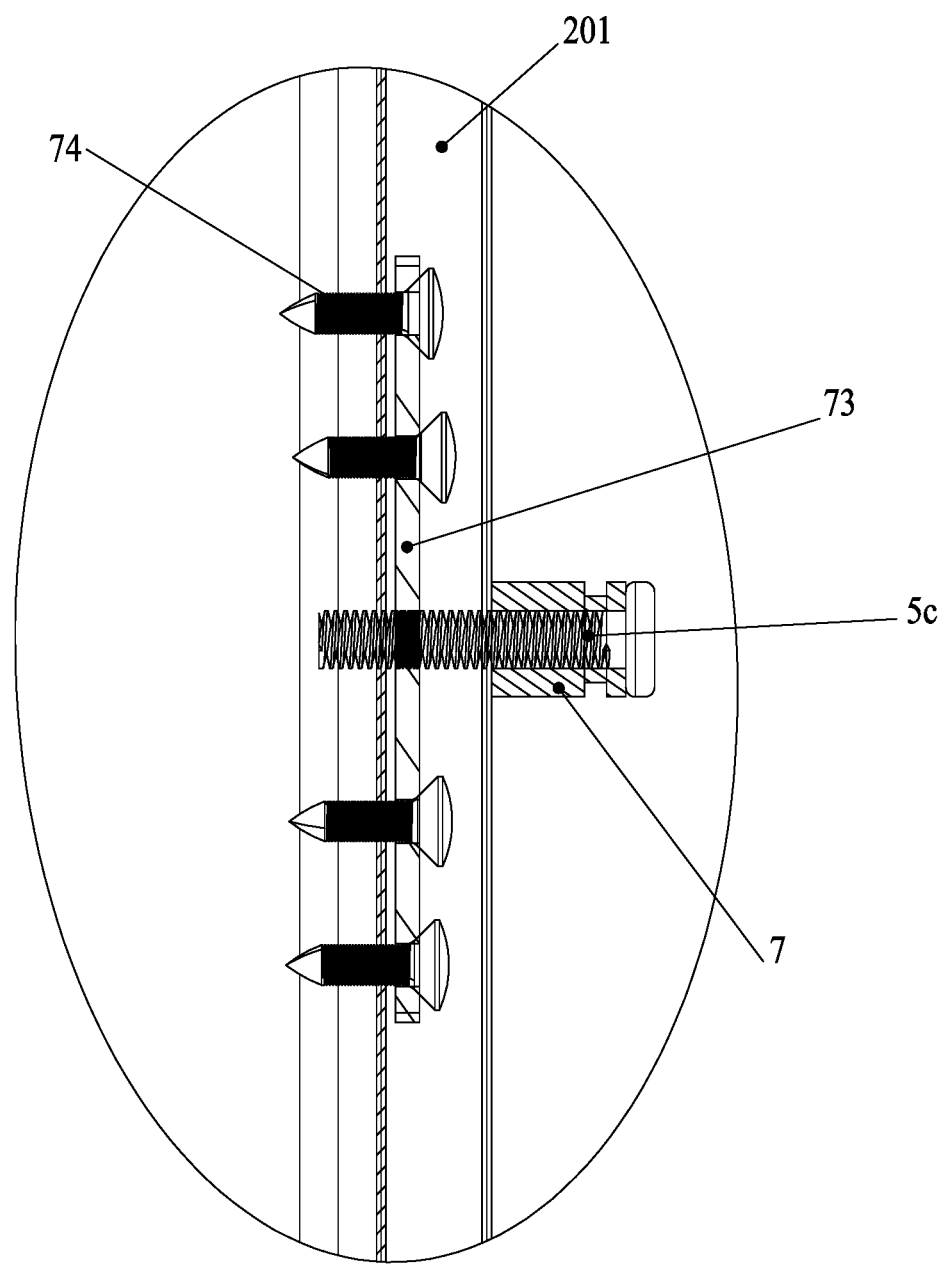
FIG. 7 is a longitudinal sectional view of a position-limiting cylinder according to the present embodiment installed on a frame.
Figure 8:
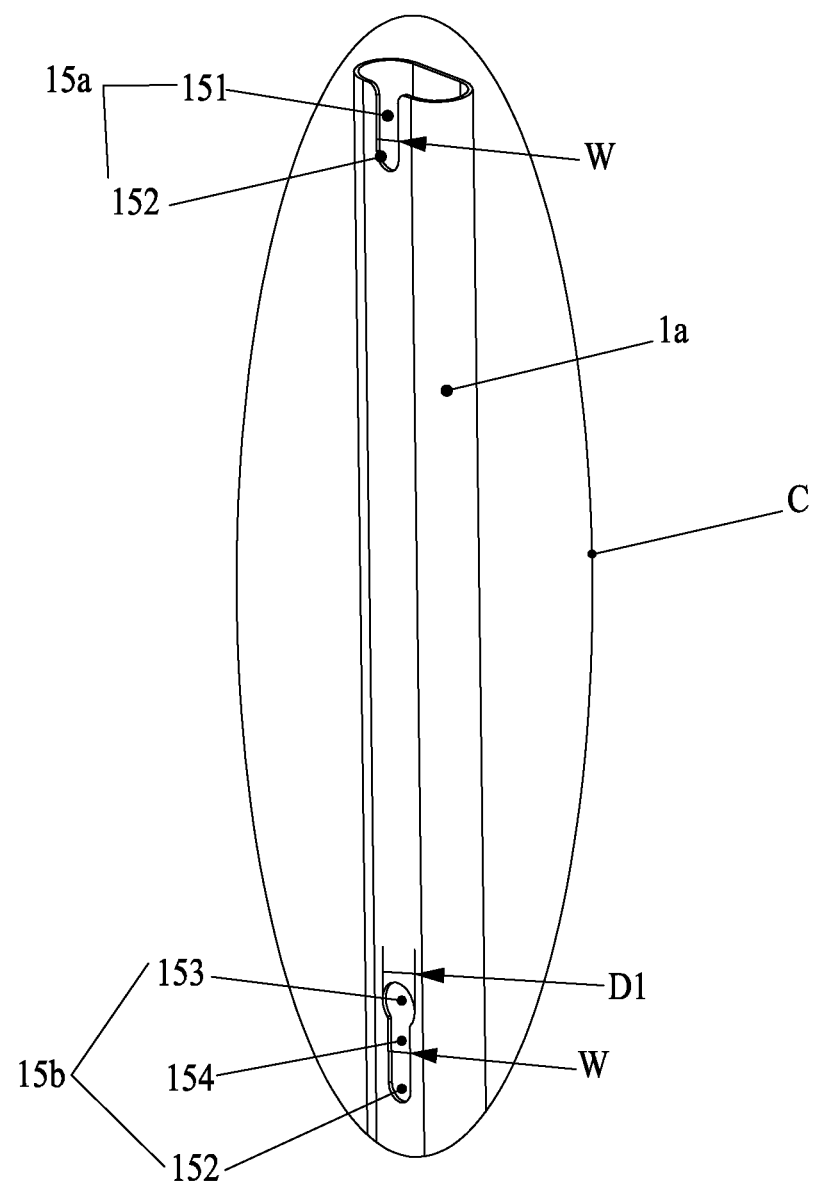
FIG. 8 is an enlarged view of part C in FIG. 1.
Figure 9:
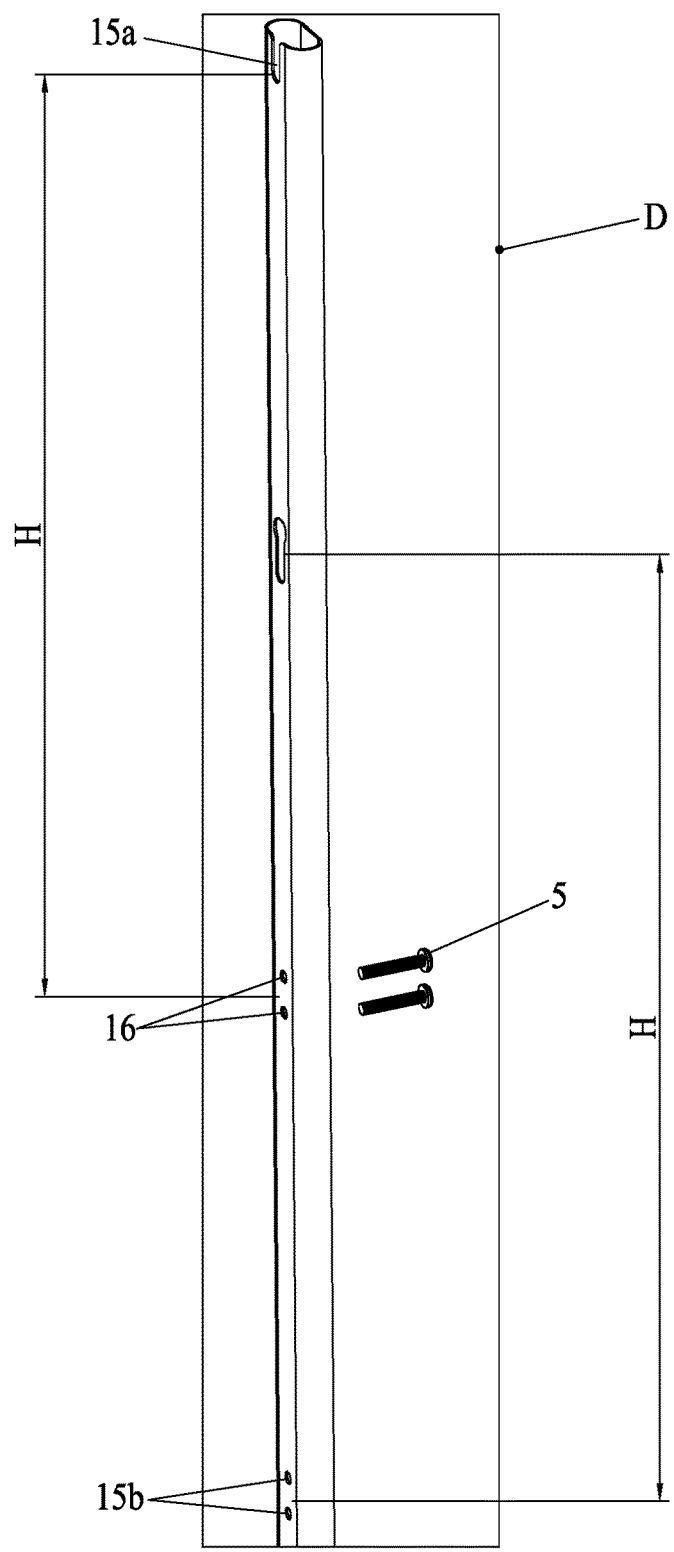
FIG. 9 is an enlarged view of part D in FIG. 1.

On this basis, this embodiment further discloses a height-adjustable whiteboard. As shown in FIGS. 7 to 9, a free end of the position-limiting cylinder 7 is provided with an annular groove 71, and each of the support rods 1 is provided with at least a first insertion slot 15a and a second insertion slot 15b at different heights on the side facing the board body 20. The first insertion slot 15a is arranged at the top of the support rod 1. The first insertion slot 15a is a first straight slot 151 whose upper end is open and lower end has an arc-shaped face 152 tangent to the annular groove 71. The second insertion slot 15b is arranged below the first insertion slot 15a, and the second insertion slot 15b includes an insertion hole 153 and a second straight slot 154, the second straight slot 154 has an upper end in communication with the insertion hole 153 and a lower end having an arc-shaped face 152 tangent to the annular groove 71. The diameter D1 of the insertion hole 153 greater than the diameter D2 of the position-limiting cylinder 7, meanwhile the width of the first straight slot 151 and the second straight slot 154 is W, and the diameter D3 of the annular groove 71 less than W less than the diameter D2 of the position-limiting cylinder 7. The position-limiting cylinder 7 can be optionally inserted into the first insertion slot 15a or the second insertion slot 15b to realize the pivotal connection between the board body 20 and the whiteboard support 10. When the position-limiting cylinder 7 is inserted into the first insertion slot 15a or the second insertion slot 15b, the edge of the slot 15a or slot 15b is engaged with the annular groove 71, and the annular groove 71 is tangent to the arc-shaped face 152, such that the position-limiting cylinder 7 is not apt to be disengaged from the slot 15a or 15b and the operation is simple.

Figure 3:
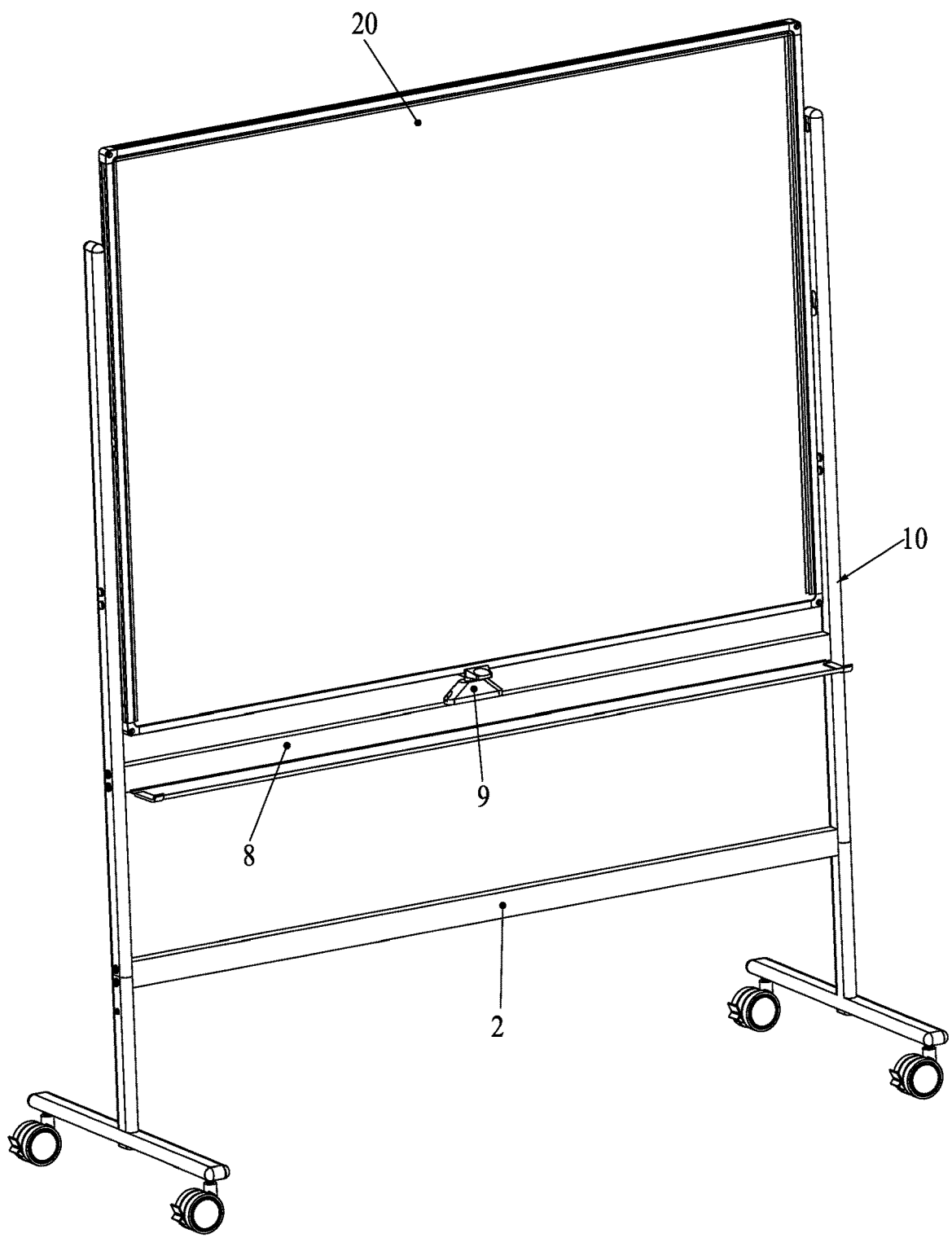
FIG. 3 is a schematic diagram showing a board body according to the present embodiment at a different height from that in FIG. 2.

As shown in FIG. 2, FIG. 3 and FIG. 9, each of the first tube bodies 1a is provided with two pairs of fifth through hole group 16 respectively below the first insertion slot 15a and the second insertion slot 15b at a distance of H from the respective insertion. Each pair of the fifth through hole group 16 includes at least two fifth through holes 161 arranged side by side in the vertical direction. By inserting the position-limiting cylinders 7 of the board body 20 into the first insertion slots 15a or the second insertion slots 15b of different heights, and also by locking the second crossbar 8 to the fifth through hole groups 16 at the corresponding distance of H from the respective insertion slots, the board body 20 can be adjusted in height to adapt to the use of people of different heights, and thus the whiteboard can be widely used.

The core of the present embodiment lies in that the support rod 1 is formed by rigidly connecting the first tube body 1a and the second tube body 1b. During transportation, the first tube body 1a, the second tube body 1b, the first crossbar 2, the board body 20 and etc. can be detached one by one, and then stored. Compared with the one-piece support rod 1 of the conventional whiteboard, the whiteboard according to the present embodiment greatly reduces the occupied area and reduces the difficulty in transportation, and the transportation cost for the enterprise. Meanwhile, by providing at least two insertion slots at different heights on the side of the support rod 1 facing the board body 20, the board body 20 of the whiteboard can be adjusted in height so as to adapt to use of people of different heights.

The above description merely relates to embodiments of the present disclosure, and is not intended to limit the design of the present disclosure. Any equivalent changes made according to key points of the design of the present disclosure will fall within the scope of protection of the present disclosure.

The invention claimed is:

1. A whiteboard, comprising a whiteboard support and a board body, wherein the whiteboard support comprises:
    two support rods arranged in parallel with each other, wherein each of the two support rods comprises a first tube body and a second tube body from top to bottom, the first tube body is formed of at least one piece, and the first tube body is a straight tube body; the second tube body is a single unitary structure formed of two straight tube bodies, the first tube body and the second tube body each have a hollow inner cavity, and contact surfaces capable of abutting against and fitting with each other are formed at least between a plurality of end faces of the first tube body and an upright rod section of the second tube body, the first tube body is fixedly provided with an insertion block in the inner cavity of one end facing the upright rod section of the second tube body, the insertion block extends outward from the inner cavity of the first tube body, and the insertion block is provided with a first threaded hole at an end away from the first tube body, the insertion block of the first tube body is inserted into the inner cavity of the upright rod section of the second tube body from top to down, which allows the end faces facing each other of the first tube body and the upright rod section of the second tube body to abut against and joint to each other; an outer end face of the upright rod section of the second tube body is provided with a first through hole at a position opposite to the first threaded hole, a first bolt passes through the first through hole and is screwed into the first threaded hole of the insertion block, which allows the upright rod section of the second tube body and the first tube body to preliminarily fix to each other, a positioning plane is formed at least on a first inner end face of the first tube body and a second inner end face of the upright rod section of the second tube body adjacent to the joint between the first tube body and the upright rod section of the second tube body, and the first inner end face and an outer end face of the first tube body are provided with two second through holes extending through each other in a direction perpendicular to the positioning plane, the second inner end face and the outer end face of the upright rod section of the second tube body are provided with two third through holes extending through each other in the direction perpendicular to the positioning plane, and the insertion block is provided with a fourth through hole at a position opposite to any one of the two third through holes;
    a first crossbar, wherein a first connecting piece is fixedly provided inside each of two ends of the first crossbar, and the first connecting piece is provided with a second threaded hole and a third threaded hole, the second threaded hole is positionally opposite to one of the two second through holes, and the third threaded hole is positionally opposite to one of the two third through holes;
    two second bolts, each of the two second bolts passes through the two second through holes and is screwed and locked in the second threaded hole of the first connecting piece; and
    two third bolts, each of two third bolts passes through one of the two third through holes located at the outer end face of the second tube body, the forth through hole of the insertion block and the other of the two third through holes located at the inner end face of the second tube body in turn and is screwed and locked in the third threaded hole of the first connecting piece;

each of the two ends of the first crossbar abuts against and is locked to the positioning plane formed by the respective first tube body and the respective upright rod section of the second tube body jointed to each other, which allows the first tube body and the upright rod section of the second tube body to rigidly connect to each other and form the one of two support rods, and ultimately the two support rods and the first crossbar to form a stable and upright whiteboard support; and the board body is arranged between the two support rods.

2. The whiteboard according to claim 1, wherein an abutting plane is formed on the outer end faces of the first tube body and the upright rod section of the second tube body, and the abutting plane and the positioning plane are in parallel with each other.

3. The whiteboard according to claim 1, wherein the upright rod section of the second tube body is additionally provided with a flange at end adjacent to the first tube body, and the flange is inserted into the inner cavity of the first tube body and forms a transition fit with an inner wall of the first tube body.

4. The whiteboard according to claim 1, wherein the insertion block is a U-shaped piece.

5. The whiteboard according to claim 1, wherein the whiteboard further comprises two position-limiting cylinders, a second crossbar and a position-limiting device; a frame is provided around periphery of the board body, and the two position-limiting cylinders are respectively fixed on two sides of the frame of the board body, and are rotatably arranged between two first tube bodies; the second crossbar is located below the board body, and is detachably fixedly connected between the two first tube bodies; the position-limiting device is arranged in middle of the second crossbar, and the position-limiting device has at least one engaging groove for engaging with the board body, and the engaging groove has a downwardly elastic margin, and the position-limiting device is configured to limit the board body to be rotatably arranged between the two first tube bodies when the engaging groove is not in a state of elastic deformation, and when the engaging groove is elastically deformed downward under a force, the board body does not interfere with the engaging groove, which allows the board body to be rotatably arranged between the two first tube bodies.

6. The whiteboard according to claim 5, wherein each of the two first tube bodies is provided with at least a first insertion slot and a second insertion slot of different heights on the side facing the board body, and each of the two position-limiting cylinders is optionally inserted into the first insertion slot or the second insertion slot to realize a pivotal connection between the board body and the whiteboard support, each of the two first tube bodies is provided with two pairs of fifth through hole group respectively below the first insertion slot and the second insertion slot at a distance of H from the respective insertion slots, each of two pairs of the fifth through hole group comprises two fifth through holes arranged side by side in vertical direction, and a second connecting piece is fixedly arranged inside each of the two ends of the second crossbar, the second connecting piece is provided with two fourth threaded holes at positions respectively opposite to two fifth through holes, and two fourth bolts pass through the two fifth through holes and are locked to the two fourth threaded holes respectively, which allows the second crossbar to be fixedly connected between the two first tube bodies, and by inserting each of the two position-limiting cylinders of the board body into the first insertion slots or the second insertion slots of different heights, and also by locking the second crossbar to the fifth through hole groups at the distance of H from the respective insertion slots, the board body is arranged between the two first tube bodies in a height-adjustable manner.

7. The whiteboard according to claim 6, wherein a free end of each of the two position-limiting cylinders is provided with an annular groove, the first insertion slot is provided at the top of the support rod, the first insertion slot is a first straight slot, the first straight slot has an upper end open and a lower end having an arc-shaped face tangent to the annular groove; the second insertion slot is arranged below the first insertion slot, and the second insertion slot comprises an insertion hole and a second straight slot, the second straight slot has an upper end in communication with the insertion hole, and a lower end having an arc-shaped face tangent to the annular groove, the diameter $D1$ of the insertion hole greater than the diameter $D2$ of each of the two position-limiting cylinders, the width of the first straight slot and the second straight slot is $W$, and the diameter $D3$ of the annular groove less than $W$ less than the diameter $D2$ of the position-limiting cylinder.

8. The whiteboard according to claim 5, wherein the whiteboard further comprises a retaining plate and a plurality of screws, the retaining plate is a flat plate with a fifth threaded hole in the middle and a plurality of sixth through holes on two sides, each of the screws passes through the sixth through hole and fixedly screwed in the frame of the board body respectively, which allows the retaining plate to fix onto the frame; the position-limiting cylinder has an axial through hole, a fifth bolt passes through the axial through hole and is screwed to the fifth threaded hole, which makes the position-limiting cylinders fixedly connect to the frame.

9. The whiteboard according to claim 5, wherein the position-limiting device is arranged in the middle of the second crossbar, the position-limiting device comprises a base, a connecting portion, an engaging seat, a spring and a spring seat; the connecting portion has a small-diameter end and a large-diameter end from top to bottom, the base has a hollow inner cavity, and has an open end at its top; the spring seat and the connecting portion are arranged to pass through the inner cavity of the base from bottom to top, which allows the spring seat to fixedly connects to the bottom end of the base and the small-diameter end of the connecting portion to protrude outwards from the open end of the base; the engaging seat is fixedly connected to an upper end of the connecting portion, and the engaging seat has an engaging groove to engage with the board body; the spring is disposed into the base, and has two ends respectively abutting against the large-diameter end of the connecting portion and the spring seat, by pressing the engaging seat downwardly, the connecting portion is displaced downward towards the inner cavity of the base, such that the engaging groove and the board body give way to each other, which allows the board body to be rotatably arranged between the two first tube bodies; and when the engaging seat is released, the connecting portion drives the engaging seat to move upwardly by an elastic restoring force applied by the spring to the connecting portion, which allows the engaging groove of the engaging seat to engage with the board body, and the angle fixation of the board body.

* * * * *